(No Model.)
O. J. EBERT.
MICROMETER CALIPERS.
No. 533,872.　　　　　Patented Feb. 12, 1895.
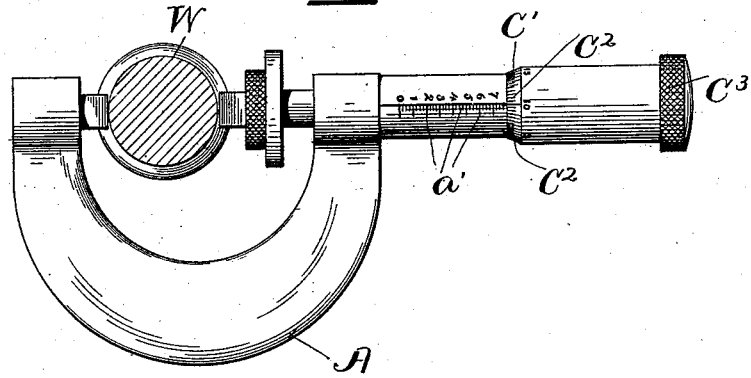
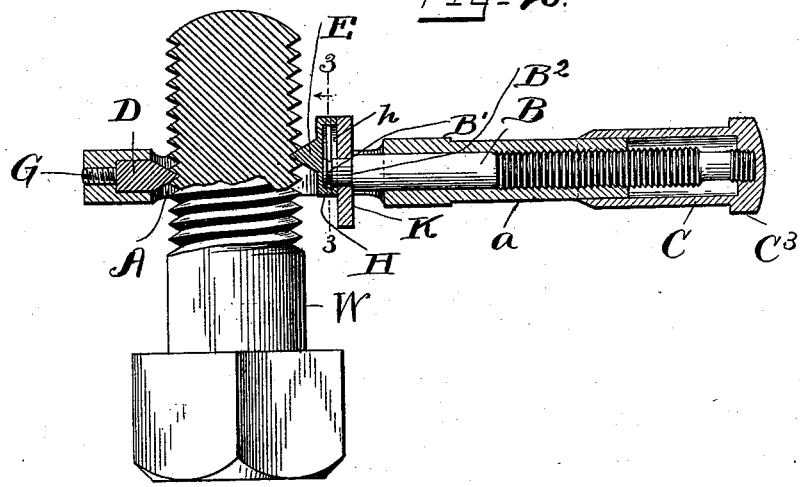
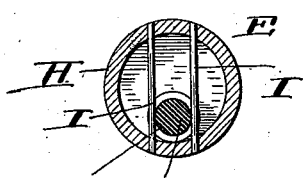
Witnesses.
E. Byron Gilchrist
Inventor.
Otto J. Ebert.
By M. D. Leggett
his Attorneys.

UNITED STATES PATENT OFFICE.

OTTO J. EBERT, OF CLEVELAND, OHIO.

MICROMETER-CALIPERS.

SPECIFICATION forming part of Letters Patent No. 533,872, dated February 12, 1895.

Application filed May 15, 1894. Serial No. 511,317. (No model.)

*To all whom it may concern:*

Be it known that I, OTTO J. EBERT, of Cleveland, in the county of Cuyahoga and State of Ohio, have invented certain new and useful Improvements in Micrometer-Calipers; and I do hereby declare the following to be a full, clear, and exact description of the invention, such as will enable others skilled in the art to which it pertains to make and use the same.

My invention relates to improvements in micrometer-calipers, the object being to provide a micrometer-calipers especially well adapted for measuring the pitch of screw-threads.

With this object in view, my invention consists in certain features of construction, and in combinations of parts hereinafter described and pointed out in the claims.

In the accompanying drawings, Figures 1 and 2 are side elevations of a micrometer-calipers embodying my invention, portions being in section in Fig. 2 to more clearly show the construction, and a screw being shown in position for measurement. Fig. 3 is an enlarged view in section on line 3—3, Fig. 2, looking in the direction of the arrow.

Referring to the drawings, A designates the body of the instrument that is preferably U-shaped, as shown. Said body is, at one end, provided with a hub $a$ that is screw-threaded internally for receiving the correspondingly-threaded screw B, that extends through hub $a$, and is rigidly secured, at its outer end, in any approved manner, to a sleeve C, that more or less envelops or embraces the outer end of hub $a$ and is movable endwise of said hub with the screw, said sleeve being movable inwardly or outwardly upon hub $a$ according as screw B is turned in the one direction or the other. We will suppose that the pitch of the threads of screw B is forty per inch. Hence one revolution of sleeve C will cause the screw to move endwise one-fortieth of an inch. Circumferential lines of division are marked upon hub $a$, as at $a'$, and a distance apart to correspond to the pitch of the threads of screw B, so that if said threads have the pitch above-mentioned, viz., forty per inch, lines $a'$ would be arranged one-fortieth of an inch apart, and sleeve C would advance one of the divisions on hub $a$ with each rotation of said sleeve C in the direction to actuate the screw and sleeve inwardly. The inner edge of sleeve C is preferably beveled, as as C', and is divided into any suitable number of divisions by lines $C^2$ located equal distances apart. Suppose said beveled edge to be divided into twenty-five equal divisions around the circumference. Then if sleeve C were given a partial rotation or turn, for instance, a fraction of a turn equal to one of its points of division,—screw B would be advanced one-twenty-fifth of one-fortieth of an inch, or one one-thousandth of an inch. Sleeve C, at its outer end, is shown provided with an externally milled portion or thumb-and-finger-piece $C^3$.

The screw or work W to be measured is held between the foot-piece D, and a piece E that is secured to the free end of screw B. If the screw whose measurement is to be taken has a V-thread, pieces D and E are preferably pointed, as shown.

I would here remark that to obtain correct measurements the work must be held true with the face of foot B and the contact between member E connected with the screw and the work must be just barely perceptible. Otherwise the pressure of the screw will cause the U-piece to bend and vitiate the accuracy of the measurement. Members D and E constitute the work-holding members, and member D is preferably adjustable endwise, by means of a screw G, to take up the wear.

My invention consists essentially, however, in a caliper-micrometer adapted to measure screws having different pitches, and work-holding member E borne by the operating-screw is, therefore, connected with said screw in such a manner that it is capable of being adjusted endwise of the work to accommodate screws or threaded work of different pitches.

A preferable construction is shown in Figs. 2 and 3, wherein point or member E is integral with a head H that has a central bore or chamber $h$ to receive the inner or adjacent end of screw B and carries two pins I I located at opposite sides of screw B, respectively. Said pins engage an annular groove B' on the screw. Hence, head H is adequately supported from the screw in such a manner as not to impede or prevent the operation of said screw independently of the engaging point or work-holding-member. A bearing-plate or block K is preferably interposed between head H and a shoulder B² formed upon screw B, the object of said plate or block being to provide a suitable bearing for head H and to cause the latter to hold the movable work-engaging point or member true relative to the work being measured. Bore or recess $h$ in head H is large enough to accommodate the adjustment of the instrument to threads having the maximum pitch for which the instrument is designed.

I would here remark that my invention is not limited to the particular construction shown but comprises broadly an instrument of the variety indicated having two work-engaging points or members adapted to engage the work on opposite sides respectively, with one of said members adjustable laterally.

What I claim is—

1. In micrometer calipers, comprising a U-shaped body-portion A provided at one end with a relatively stationary work-engaging point or member D and terminating at its other end in an internally-screw-threaded sleeve or hub $a$, a screw B engaging the threaded bore of said hub, said screw, at its outer end, being provided with suitable means for turning the same, and, at its inner end, bearing a laterally-adjustable work-engaging point or member, the two work-engaging points or members being located opposite or approximately opposite to each other, substantially as set forth.

2. In a micrometer calipers, the combination with a suitably supported and relatively stationary work-engaging point or member, of the head H provided with work-engaging member E and chambered, as at $h$; operating screw B grooved, as at B', and shouldered, as at B²; pins I, and bearing-plate or block K, all arranged and operating substantially as shown, for the purpose specified.

In testimony whereof I sign this specification, in the presence of two witnesses, this 12th day of March, 1894.

OTTO J. EBERT.

Witnesses:
C. H. DORER,
WARD HOOVER.